United States Patent
Arteiro et al.

(10) Patent No.: US 10,919,442 B1
(45) Date of Patent: Feb. 16, 2021

(54) DEVICES AND METHODS FOR MOTOR VEHICLE U-TURN SIGNALING

(71) Applicants: José C. Arteiro, Lake Worth, FL (US); Waleska Sanchez, Lake Worth, FL (US)

(72) Inventors: José C. Arteiro, Lake Worth, FL (US); Waleska Sanchez, Lake Worth, FL (US)

(*) Notice: Subject to any disclaimer, the term of this patent is extended or adjusted under 35 U.S.C. 154(b) by 0 days.

(21) Appl. No.: 16/815,825

(22) Filed: Mar. 11, 2020

(51) Int. Cl.
*B60Q 1/34* (2006.01)
*B60Q 1/38* (2006.01)
*B60Q 1/26* (2006.01)

(52) U.S. Cl.
CPC .............. *B60Q 1/38* (2013.01); *B60Q 1/2607* (2013.01)

(58) Field of Classification Search
CPC ........... B60Q 1/38; B60Q 1/2607; B60Q 1/34
See application file for complete search history.

(56) References Cited

U.S. PATENT DOCUMENTS

| | | | |
|---|---|---|---|
| 5,663,708 A | 9/1997 | Strawn | |
| 8,519,840 B1* | 8/2013 | Banks | B60Q 1/34 340/465 |
| 9,643,533 B1* | 5/2017 | Houss | B60Q 1/343 |
| 2005/0237174 A1* | 10/2005 | Hu | B60Q 1/34 340/476 |
| 2012/0078511 A1* | 3/2012 | Lim | G01C 21/3632 701/437 |
| 2014/0091920 A1* | 4/2014 | Thompson | B60Q 1/38 340/475 |
| 2016/0031364 A1 | 2/2016 | Kerr | |

* cited by examiner

*Primary Examiner* — Phung Nguyen
(74) *Attorney, Agent, or Firm* — Clark & Elbing LLP

(57) ABSTRACT

Described herein are systems, methods, and kits useful for signaling the intention and execution of a U-turn maneuver by a motor vehicle. A combination of existing headlights, reverse lights, turn-signal lights and side light modules are used in concert to generate a universally applicable signal that communicates to other travelers that a U-turn maneuver is intended and under execution. The signaling can be mediated via use of a U-turn signal switch that activates the light modules of a vehicle that correspond to the direction of the U-turn maneuver.

12 Claims, 7 Drawing Sheets

Right U-turn signal
(114)

Left U-turn signal (118)

DEVICES AND METHODS FOR MOTOR VEHICLE U-TURN SIGNALING

BACKGROUND OF THE INVENTION

Motor vehicles are equipped with exterior lighting modules (e.g., headlights, taillights, reverse lights, hazard lights and turn signal light modules) that communicate vehicular location and status, as well as the maneuver intentions of the operator (FIGS. 1-2). For example, headlights can be used to illuminate an area in front of a vehicle to improve visibility for the operator. Taillights are used to relay to other vehicles and people near the vehicle that the vehicle is stopping (FIG. 2). Reverse lights of vehicles are designed to be engaged when a vehicle is in reverse, thereby providing a visual indication to other vehicles and people near the vehicle that the vehicle operator intends to travel backwards. Turn-signal blinkers are used to communicate the intention of a vehicle operator to make a left or right turn. Often turn-signal lighting modules are positioned at the anterior end, posterior end, and sides of a vehicle in order to communicate a clear and visible signal to others surrounding the vehicle about an upcoming turn maneuver. Vehicles typically lack any devices that can be used by a vehicle operator to signal a U-turn maneuver. Instead, to signal a U-turn maneuver a vehicle operator is limited to using conventional left and right turn-signal blinkers. Because the left and right turn signals alone insufficiently communicate an intention to perform a U-turn maneuver, the use of these signals may create confusion about the intention of the vehicle operator and may possibly increase the risk of a collision during the performance of a U-turn maneuver.

Accordingly, there remains a need for devices and methods of signaling a U-turn maneuver.

BRIEF SUMMARY OF THE INVENTION

Described herein are systems, methods, and kits useful for signaling the intention and execution of a U-turn maneuver by a motor vehicle. A combination of existing headlights, reverse lights, turn-signal lights and side light modules are used in concert to generate a universally applicable signal that communicates to other travelers that a U-turn maneuver is intended and under execution. The signaling can be mediated via use of a U-turn signal switch that activates the light modules of a vehicle that correspond to the direction of the U-turn maneuver.

In a first aspect, the invention provides a method of signaling a U-turn maneuver by a motor vehicle. The method features the use of the existing front and rear lighting assemblies on a left and a right side of the motor vehicle. Moreover, each front lighting assembly includes a headlight and turn signal light and each rear lighting assembly includes a rear reverse light and a turn signal light. Furthermore, the method includes triggering a U-turn signal activation mechanism that activates flashing by the front headlight, the rear reverse light, and the turn-signal lights on the left or right side of the motor vehicle, in which the front headlight and the rear reverse light (on the side of the vehicle corresponding to the direction of the U-turn) signal in coordination with the turn-signal lights of the motor vehicle, thereby signaling a U-turn maneuver. In some embodiments, the signaling includes blinking, flashing or intermittent lighting.

In another aspect, the invention provides a processor(s) or switch(es) for signaling a U-turn maneuver by a motor vehicle. The processor(s) or switch(es) are configured to activate the existing front and rear lighting assemblies on a left or a right side of the vehicle (depending on the direction of the U-turn maneuver desired). Moreover, each front lighting assembly includes a headlight and turn signal light and each said rear lighting assembly includes a rear reverse light and a turn signal light. Furthermore, the processor(s) or switch(es) controls coordinated illumination of the front headlight, the rear reverse light, and the turn-signal light on the left or right side of the motor vehicle upon activation of a U-turn signal activation mechanism. In some embodiments, the coordinated illumination comprises blinking, flashing, or intermittent lighting. In some embodiments, the processor(s) or switch(es) controls coordinated illumination on the side of the motor vehicle that corresponds to a direction of activation of the U-turn signal mechanism.

In another aspect, the invention provides a kit useful for new installations and for retrofitting a motor vehicle for signaling of a U-turn maneuver. The kit includes a processor(s) or a relay switch(es) that is connected by wires or that is wirelessly connected to the existing front and rear lighting assemblies on a left and a right side of the vehicle. Moreover, each front lighting assembly comprises a headlight and turn signal light and each rear lighting assembly includes a rear reverse light and a turn signal light. The processor(s) or switch(es) is configured to activate simultaneous flashing of the front and rear lighting assemblies on the left or right side of the vehicle (corresponding to a direction of activation of the U-turn signal mechanism) when the U-turn signal is activated. The kit optionally includes instructions for installing the processor(s) or switch(es) in the motor vehicle. In some embodiments, the processor(s) or switch(es) of the kit controls coordinated illumination of the front and rear lighting assemblies of the motor vehicle. In some embodiments, the coordinated illumination comprises blinking, flashing, or intermittent lighting.

DETAILED DESCRIPTION OF THE INVENTION

U-Turn Signaling System

Figure 1:
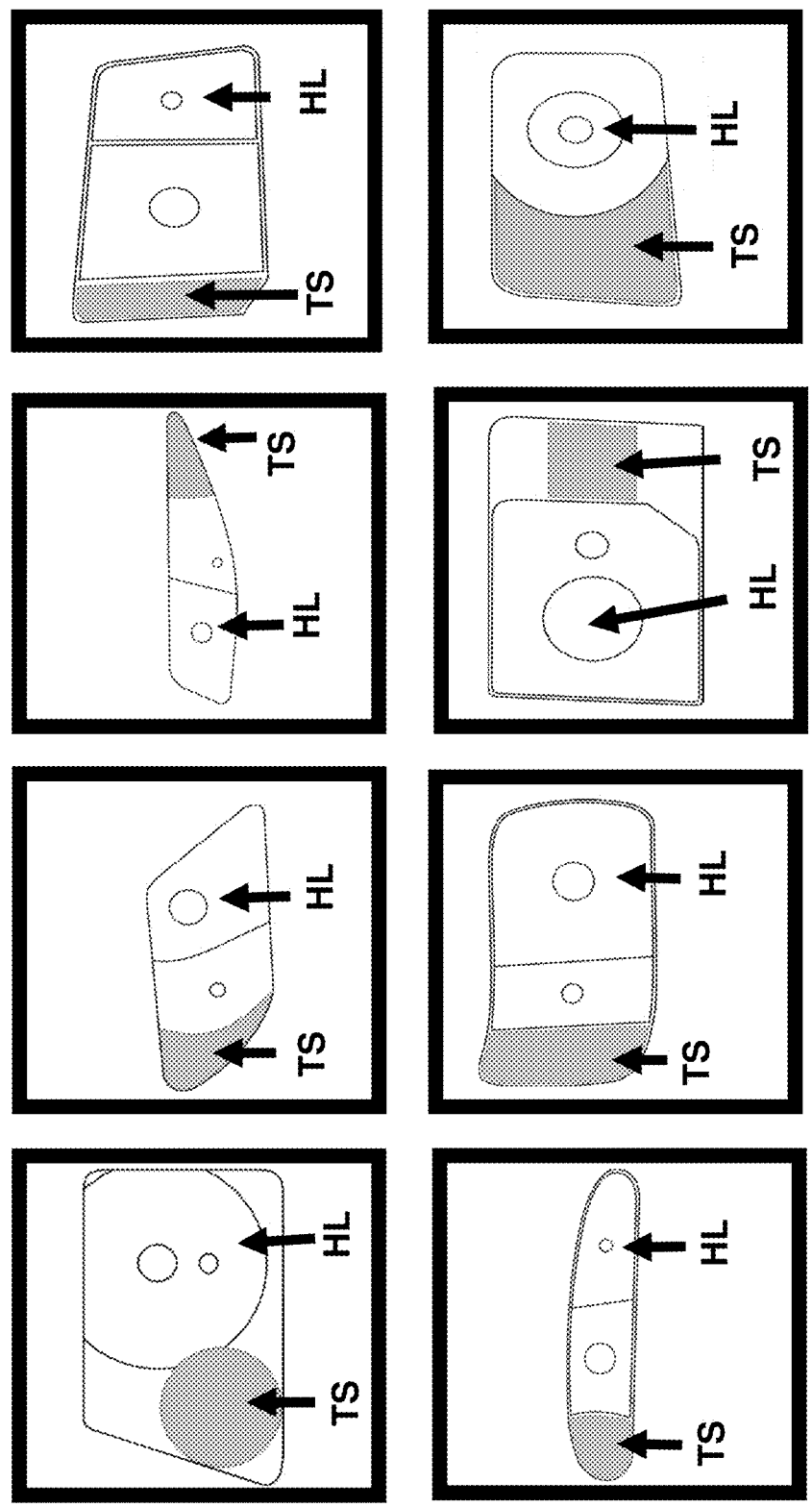
FIG. 1 shows photographic images of examples of current headlight and front turn-signal assemblies from various motor vehicle manufacturers. TS=turn signal; HL=headlight.
Figure 2:
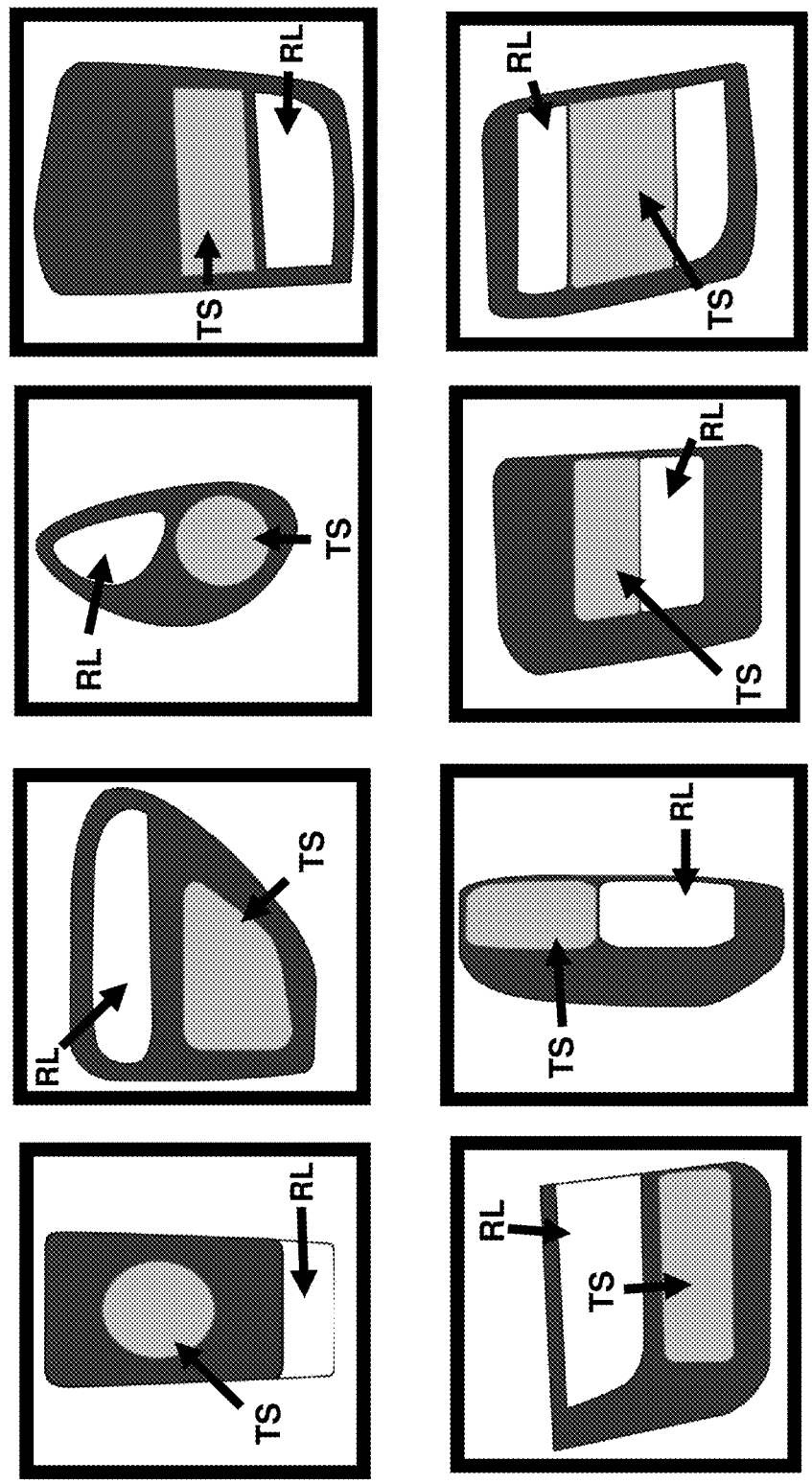
FIG. 2 shows photographic images of examples of current reverse light and rear turn-signal assemblies from various motor vehicle manufacturers. TS=turn signal; RL=reverse light.
Figure 3:
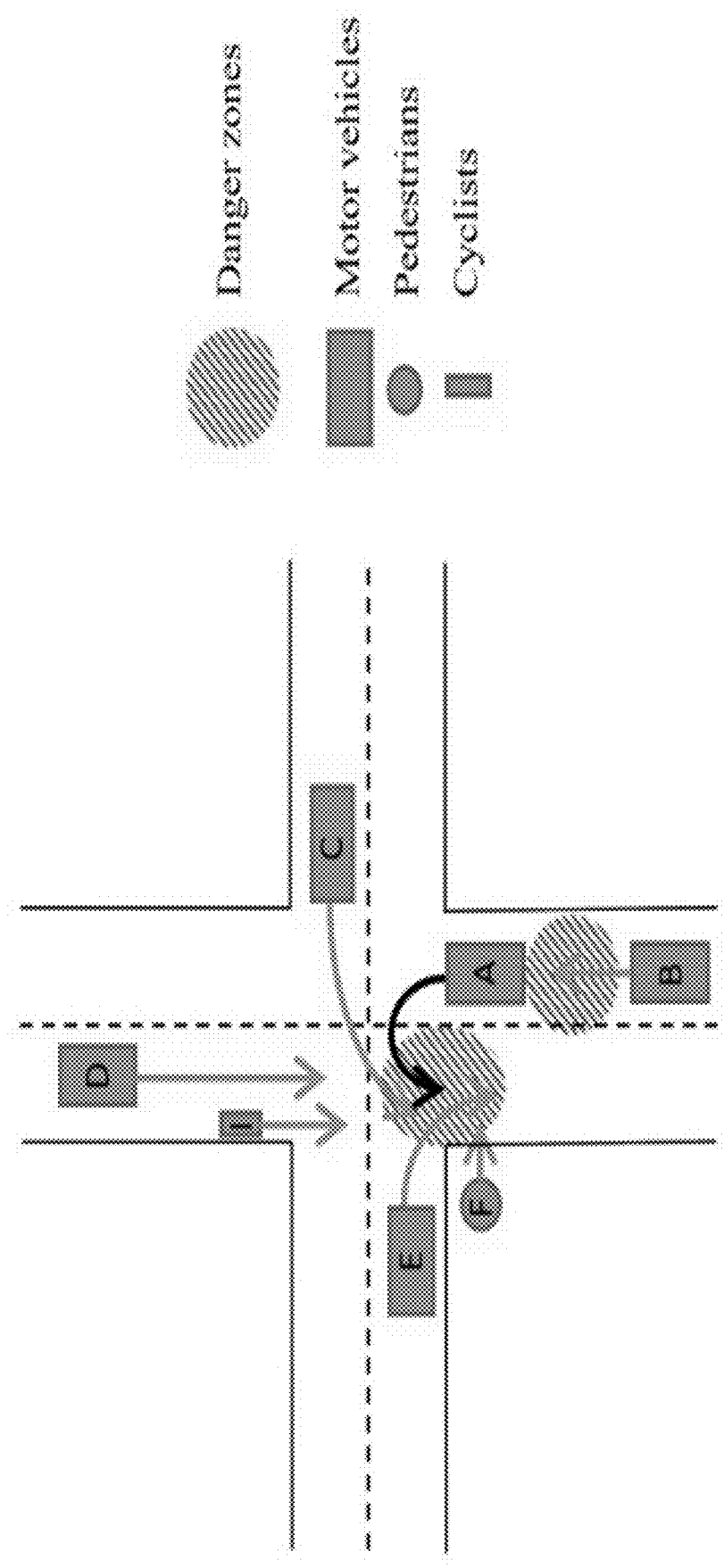
FIG. 3 is a schematic showing danger zones for collisions due to a failure to signal a U-turn maneuver. The danger of a collision with other motor vehicles, cyclists and pedestrians arises from the inability to signal a U-turn maneuver to all travelers.
Figure 4:
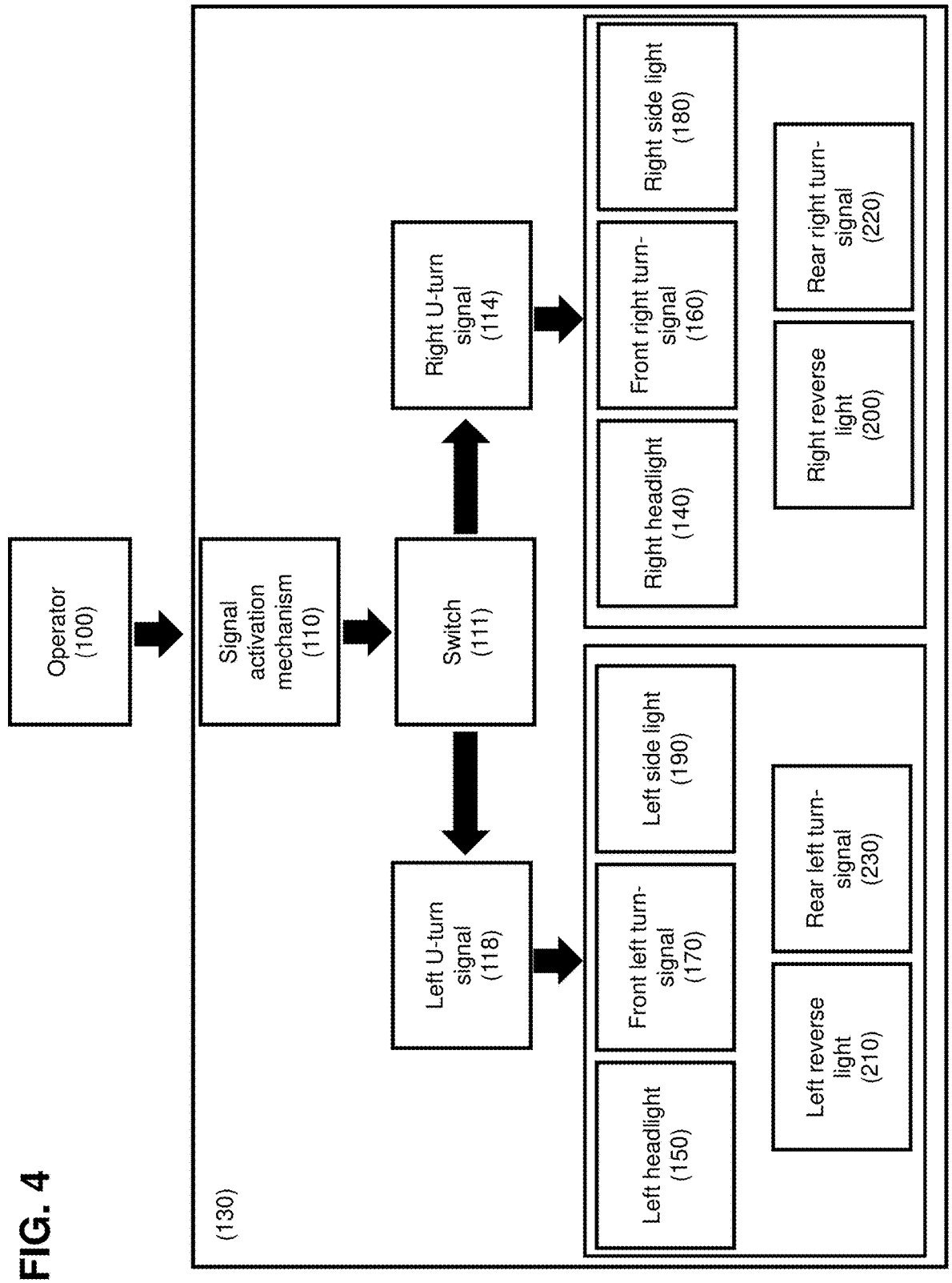
FIG. 4 is a diagram describing U-turn signaling system (130). Vehicle operator (100) initiates the U-turn signal by triggering signal activation mechanism (110). Signal activation mechanism (110) activates a right U-turn signal or a left U-turn signal via a U-turn signal switch (111) following triggering by vehicle operator (100). Components activated by signal activation mechanism (110) for right U-turn signal (114) are (140), (160), (180), (200), and (220). Components activated by signal activation mechanism (110) for left U-turn signal (118) are (150), (170), (190), (210), and (230).
Figure 5:
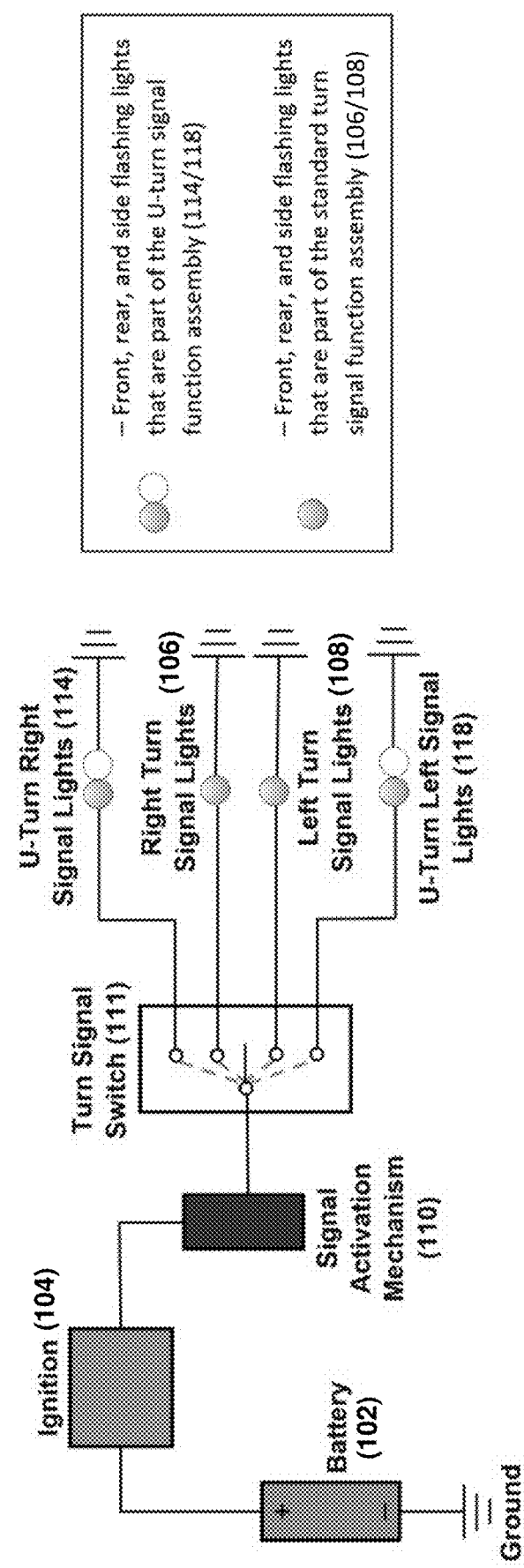
FIG. 5 is a schematic showing the wiring diagram of a U-turn signal system. Power from battery (102) is directed to signal activation mechanism (110) through the activation of ignition (104). Signal activation mechanism sends power to turn signal switch (111) which then directs power to one of four groups of light modules, Right U-turn signal lights (114), Right turn signal lights (106), Left turn signal lights (108), or Left U-turn signal lights (118).
Figure 6:
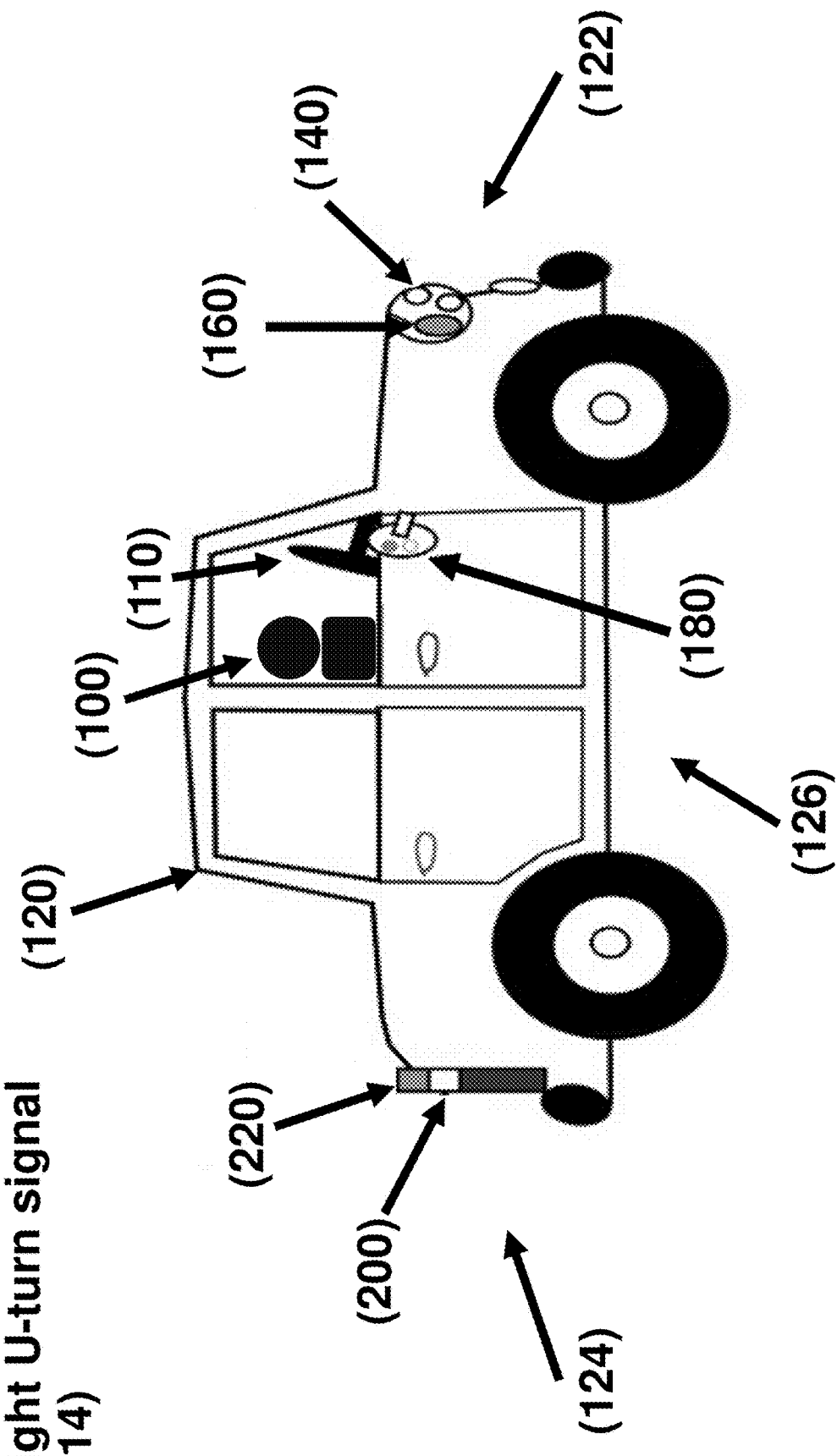
FIG. 6 is a schematic of the right side of vehicle (120) and the components involved in right U-turn signal (114). In a right U-turn signal configuration (114), components (140), (160), (180), (200), and (220) flash in a coordinated or simultaneous manner.
Figure 7:
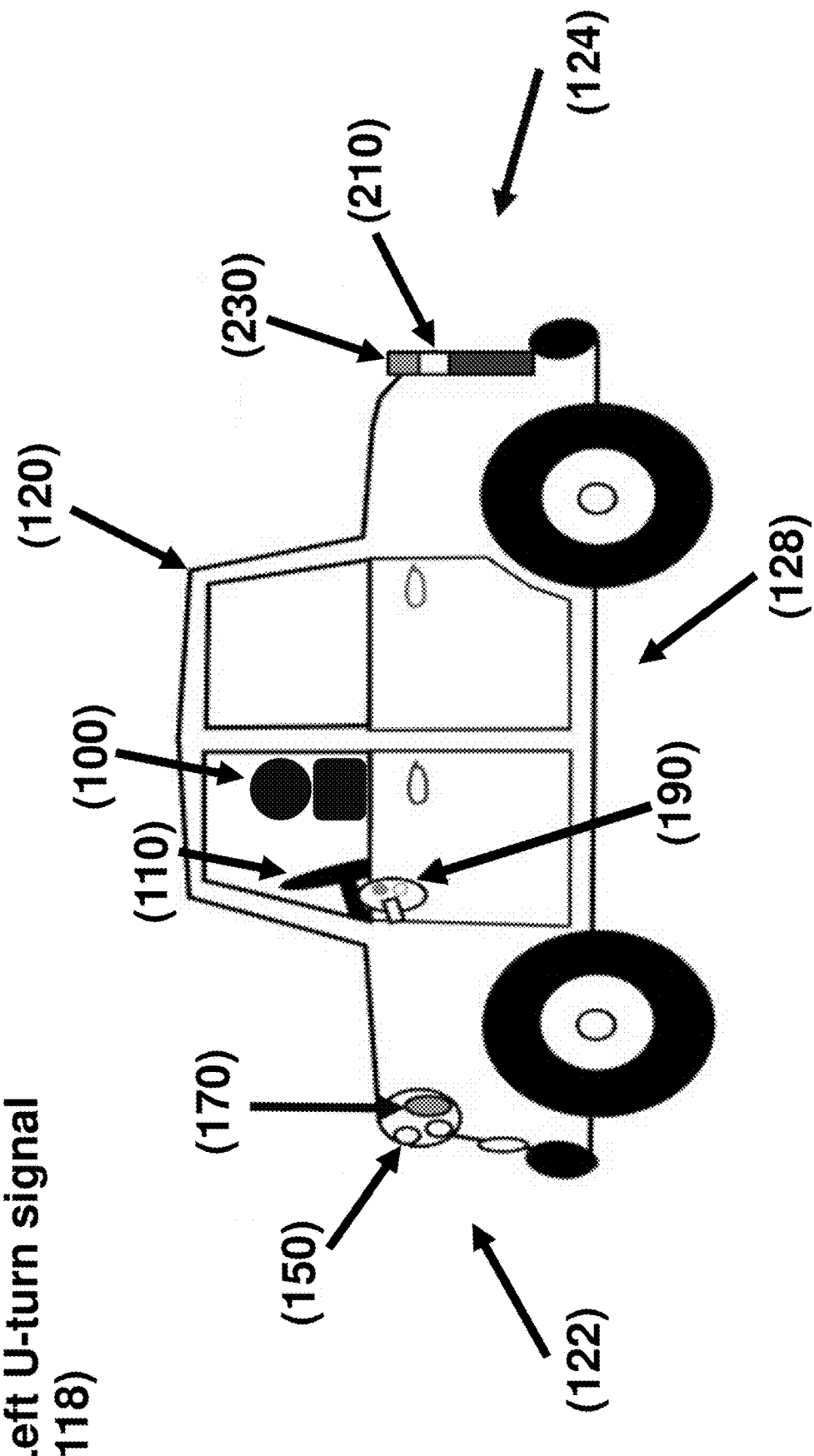
FIG. 7 is a schematic of the left side of vehicle (120) and the components involved in the left U-turn signal (114). In a left U-turn signal (118) configuration, components (150), (170), (190), (210), and (230) flash in a coordinated or simultaneous manner.

Described herein are systems, methods and kits for signaling a U-turn maneuver by an operator of a motor vehicle using the existing lighting modules the vehicle. Operator (100) of vehicle (120) may be a human person or an artificial intelligence program (FIGS. 4, 6-7). Vehicle (120) can be any motor vehicle used for transporting passengers or freight (e.g., a passenger automobile, a public transport bus, a cargo truck, and a motorcycle). Vehicle (120) can also be equipped with signal activation mechanism (110) for actuating, maintaining and terminating the visible signal apparatus(es) for signaling a U-turn maneuver. In an embodiment, signal activation mechanism (110) can include a processor or a switch specifically configured to produce a U-turn signal upon activation by operator (100) of vehicle (120). Vehicle (120) can further be equipped with a U-turn signal switch (111) that (1) electrically connects the light assemblies of vehicle (120) to signal activation mechanism (110) and (2) electrically connects a power supply of vehicle (120) to the light assemblies. Four turn maneuver options (e. g., right U-turn (114), left U-turn (118), right turn (106), and left turn (108)) are available for activation via switch (111) (FIG. 5). Four turn maneuver options (e. g., right U-turn (114), left U-turn (118), right turn (106), and left turn (108)) are available for activation via switch (111) (FIG. 5). Vehicle (120) may be equipped with visible signal apparatuses, such as light modules, at one or more, or all, of anterior end (122) of vehicle (120), right (126) and/or left (128) sides of vehicle (120), and posterior end (124) of vehicle (120) (FIGS. 6-7). At anterior end (122) of vehicle (120), U-turn signaling system (130) may also include right headlight component (140) and left headlight component (150) (FIGS. 6-7). The left and right headlights of vehicle (120) may include daytime running lights and low-beam headlight modules. Vehicle (120) may also include turn-signal lights for signaling a right turn (106) and for signaling a left turn (108) (FIG. 5). Anterior end (122) of vehicle (120) may also include front right turn-signal component (160) and front left turn-signal component (170). Right (126) and left (128) sides of vehicle (120) may also include side light modules (e.g., right side light module (180) and left side light module (190)) (FIGS. 6-7). U-turn signaling system (130) may also include right reverse light module (200) and left reverse light module (210) at posterior end (124) of vehicle (120) (FIGS. 6-7). Rear right turn-signal component (220) and rear left turn-signal component (230) may also be included at posterior end (130) of vehicle (120) (FIGS. 6-7). U-turn signaling system (130) may also include right U-turn signal (114) and/or left U-turn signal (118) (FIGS. 6-7).

Use of the U-Turn Signaling System

U-turn signaling system (130) (FIGS. 4-7) can be used to alert and communicate the intention and execution of a U-turn maneuver by an operator of a motor vehicle. Activation of U-turn signaling system (130) can be achieved using any number of interfaces of signal activation mechanism (110), such as by pressing a physical button or by deflecting a physical lever, in which the activation interface is electrically connected to U-turn signaling system (130) and its light assemblies. Electrical connection of signal activation mechanism (110) and the light assemblies of U-turn signaling system (130) can be achieved by implementation of an electrical switch (111) (FIGS. 4-5) that on one end is connected to signal activation mechanism (110) and on another end is electrically connected to the light assembles of U-turn signaling system (130). Triggering of electrical switch (111) by signal activation mechanism (110) for a right or left U-turn signal connects electrical power from a vehicle electrical power source (e.g., a battery (102)) and delivers electricity, when ignition module (104) is activated, to drive illumination of the light assemblies in U-turn mechanism (130). Alternatively, U-turn signaling system (130) can be configured with sensors of signal activation mechanism (110) that can be used to activate U-turn signaling system (130) using, e.g., gestures or voice command. Another option for activating U-turn signaling system (130) is by use of programming of signal activation mechanism (110), in which U-turn signaling system (130) is programmed to activate by following indications from a route-determining program (e.g., a GPS-based navigation system). Activation of U-turn signaling system (130) by operator (100) of vehicle (120) recruits, via wired and/or wireless communication, the visible signal apparatuses of the vehicle. Activation of U-turn signaling system (130) by operator (100) of vehicle (120) can start with a command to signal activation mechanism (110) by operator (100) of vehicle (120) that determines whether a right U-turn signal (114) (FIG. 6), or a left U-turn signal (118) (FIG. 7) is to be executed. Execution of right U-turn signal (114) (FIG. 6) can be achieved by triggering signal activation mechanism (110) to activate right headlight (140), front right turn-signal component (160), right side light module (180), right reverse light module (200), and rear right turn-signal component (220) to flash in a coordinated or simultaneous manner. Execution of left U-turn signal (118) (FIG. 7) can be achieved by triggering signal activation mechanism (110) to activate left headlight (150), front left turn-signal component (170), left side light module (190), left reverse light module (210), and rear left turn-signal component (230) to flash in a coordinated or simultaneous manner. U-turn signaling system may include the simultaneous flashing of the right (114) or left (118) U-turn signal lights in coordinated manner at any one of frequencies 1-10 Hz (e. g., 1-10 Hz, 1-9 Hz, 1-8 Hz, 1-7 Hz, 1-6 Hz, 1-5 Hz, 1-4 Hz, 1-3 Hz, 1-2 Hz, or 10 Hz, 9 Hz, 8 Hz, 7 Hz, 6 Hz, 5 Hz, 4 Hz, 3 Hz, 2 Hz, or 1 Hz) including all subranges in between. Flashing frequencies may be determined by a vehicle manufacturer or as established by automobile standards, such as those set by SAE International (e.g., J1690 or later) and other automotive organizations. Termination of U-turn signaling system (130) can be achieved upon completion of the U-turn maneuver. U-turn signaling system (130) can be configured to signal a U-turn maneuver at night without causing interference with the function of headlight modules. For example, a vehicle's operator can indicate a left or right U-turn signal at night, when the vehicle low-beam headlights are already in use, using a vehicle's existing daytime running lights (DRL). Also, when vehicle (120) is in reverse (e.g., the reverse light modules are illuminated) the processor or switch of signal activation mechanism (110) may deactivate the U-turn signaling system (130) to avoid interference with normal reverse signal light function.

Kits

The system described herein can be provided as a kit that can be used, e.g., for new installations or to retrofit existing motor vehicles with hardware for actuating the U-turn signaling and, optionally, with software to control the visible signal apparatuses of a motor vehicle in response to actuation. Kits may include one or more (e.g., 2, 3, 4, 6, 8, 10, 12, 14, 16, 18, 20 or more) apparatuses (e.g., a processor(s) or switch(es)) for actuating the U-turn signaling system and one or more (e.g., 2, 3, 4, 5, or more) software programs to control the visible signal apparatuses.

EXAMPLES

The following examples are provided for the purpose of illustrating the invention and are not meant to limit the invention in any way.

Example 1. Use of the U-Turn Signaling System in a Sport Utility Vehicle (SUV)

The U-turn signaling system described herein may be used to signal the intention of a vehicle operator, e.g. driver, to perform a left U-turn to other travelers on the road. The driver of an SUV approaches an intersection and intends to execute a left U-turn. The driver pulls a lever near the steering wheel to trigger a signal activation mechanism (110) that activates a left U-turn signal (118) (FIG. 7). Signal activation mechanism (110) triggers the left U-turn signal (118) causing the left headlight (150), the front left turn-signal light module (170), the left side mirror turn indicator light (190), the left reverse light (210), and the rear left turn-signal light module (230) to flash in concert and simultaneously until the U-turn maneuver is complete.

Example 2. Use of U-Turn Signaling System in a Sedan

The U-turn signaling system described herein may be used to signal the intention of a vehicle operator, e.g. driver, to perform a right U-turn to other travelers on the road. The driver of a sedan approaches an intersection and intends to execute a right U-turn. The driver presses a button on the steering wheel of the sedan to trigger a signal activation mechanism (110) (e.g., one that may be wired as in FIG. 5) that activates the right U-turn signal (FIG. 6). Signal activation mechanism (110) triggers the right U-turn signal (114) causing the right headlight (140), the front right turn-signal light module (160), the right side mirror turn indicator light (180), the right reverse light (200), and the rear right turn-signal light module (220) to flash in concert and simultaneously until the U-turn maneuver is complete.

Example 3. Use of U-Turn Signaling System in a A.I. Controlled Cargo Truck

An autonomous cargo truck approaches an intersection and the operator of the autonomous cargo truck, e.g., an A.I. program, intends to execute a left U-turn. A route-determining system, e.g. a GPS-based navigation system, communicates to the operator to trigger signal activation mechanism (110). The A.I. program triggers the left U-turn signal (118) (FIG. 7) via signal activation mechanism (110) causing the left headlight (150), the front left turn-signal light module (170), the left side light (190), the left reverse light (210), and the rear left turn-signal light module (230) to flash simultaneously until the U-turn maneuver is complete.

Example 4. Use of U-Turn Signaling System at Night

The U-turn signaling system described herein may be used at night without interference with normal low-beam and/or high beam headlight function. A driver of a sedan approaches an intersection and intends to execute a left U-turn. The driver pushes a lever near the steering wheel of the sedan to trigger a signal activation mechanism (110) (e.g., one that may be wired as in FIG. 5) that activates the left U-turn signal (118) (FIG. 7). The vehicle low-beam headlights are in use and therefore the daytime running lights (DRLs) of the sedan are used in coordination with the front left turn-signal module (170), the left side light (190), the left reverse light (210), and the rear left turn-signal light module (230) to flash simultaneously at the same frequency until the U-turn maneuver is completed.

Other Embodiments

While the invention has been described in connection with specific embodiments thereof, it will be understood that it is capable of further modifications and this application is intended to cover any variations, uses, or adaptations of the invention following, in general, the principles of the invention and including such departures from the invention that come within known or customary practice within the art to which the invention pertains and may be applied to the essential features hereinbefore set forth, and follows in the scope of the claims.

Other embodiments are within the claims.

The invention claimed is:

1. A method of signaling a U-turn maneuver by a motor vehicle, said motor vehicle comprising front and rear lighting assemblies on a left and a right side of the vehicle, wherein each said front lighting assembly comprises a headlight and turn signal light and each said rear lighting assembly comprises a rear reverse light and a turn signal light, wherein the method comprises triggering a U-turn signal activation mechanism that activates flashing by the front headlight, the rear reverse light, and the turn-signal light on the left or right side of the motor vehicle, wherein the front headlight and the rear reverse light signal in coordination with the turn-signal light of the motor vehicle.

2. The method of claim 1, wherein the signaling comprises blinking, flashing or intermittent lighting.

3. The method of claim 2, wherein the coordinated signaling occurs on the side of the motor vehicle that corresponds to the direction of the U-turn maneuver.

4. A processor or switch for signaling a U-turn maneuver by a motor vehicle, said motor vehicle comprising front and rear lighting assemblies on a left and a right side of the vehicle, wherein each said front lighting assembly comprises a headlight and turn signal light and each said rear lighting assembly comprises a rear reverse light and a turn signal light, wherein the processor or switch is configured to control coordinated illumination of the front headlight, the rear reverse light, and the turn-signal light on the left or right side of the motor vehicle upon activation of a U-turn signal activation mechanism.

5. The processor or switch of claim 4, wherein the coordinated illumination comprises blinking, flashing, or intermittent lighting.

6. The processor or switch of claim 5, wherein the switch controls coordinated illumination on the side of the motor vehicle that corresponds to a direction of activation of the U-turn signal mechanism.

7. The processor or switch of claim 4, wherein the processor or switch is configured for wired or wireless installation.

8. A kit comprising the processor or switch for signaling a U-turn maneuver by a motor vehicle of claim 4 and, optionally, instructions for installing the processor or switch in the motor vehicle.

9. The kit of claim 8, wherein the processor or switch is configured to control coordinated illumination of the front and rear lighting assemblies of the motor vehicle.

10. The kit of claim 9, wherein the coordinated illumination comprises blinking, flashing, or intermittent lighting.

11. The kit of claim 8, wherein the processor or switch is configured to control coordinated illumination on the side of the motor vehicle that corresponds to a direction of activation of the U-turn signal mechanism.

12. The kit of claim 8, wherein the processor or switch is for retrofitting a motor vehicle.

* * * * *